(12) United States Patent
Gupta et al.

(10) Patent No.: US 12,093,217 B2
(45) Date of Patent: *Sep. 17, 2024

(54) FILE TRANSFER PRIORITIZATION DURING REPLICATION

(71) Applicant: Dell Products, L.P., Round Rock, TX (US)

(72) Inventors: Kaushik Gupta, Pune (IN); Shiv S. Kumar, Pune (IN); Jai P. Gahlot, Pune (IN)

(73) Assignee: DELL PRODUCTS L.P., Round Rock, TX (US)

( * ) Notice: Subject to any disclaimer, the term of this patent is extended or adjusted under 35 U.S.C. 154(b) by 259 days.

This patent is subject to a terminal disclaimer.

(21) Appl. No.: 17/538,340

(22) Filed: Nov. 30, 2021

(65) Prior Publication Data

US 2023/0169038 A1 Jun. 1, 2023

(51) Int. Cl.
*G06F 16/16* (2019.01)
*G06F 16/11* (2019.01)
*G06F 16/17* (2019.01)
*G06F 16/182* (2019.01)
*G06F 16/27* (2019.01)

(52) U.S. Cl.
CPC ............ *G06F 16/16* (2019.01); *G06F 16/119* (2019.01); *G06F 16/1734* (2019.01); *G06F 16/1844* (2019.01); *G06F 16/27* (2019.01)

(58) Field of Classification Search
CPC .... G06F 16/16; G06F 16/1734; G06F 16/119; G06F 16/27; G06F 16/1844
USPC ........................................................ 707/637
See application file for complete search history.

(56) References Cited

U.S. PATENT DOCUMENTS

| 7,617,217 | B1* | 11/2009 | Chen | G06F 16/128 |
| | | | | 707/999.01 |
| 7,818,299 | B1* | 10/2010 | Federwisch | G06F 11/2066 |
| | | | | 707/649 |
| 7,991,791 | B1* | 8/2011 | Chen | G06F 16/128 |
| | | | | 707/787 |
| 8,069,149 | B1* | 11/2011 | Chen | G06F 16/128 |
| | | | | 707/649 |
| 10,983,873 | B1 | 4/2021 | Blackard | |
| 11,086,726 | B2 | 8/2021 | Kumar et al. | |

(Continued)

OTHER PUBLICATIONS

Gupta et al. "File Transfer Prioritization During Replication" U.S. Appl. No. 17/538,486, filed Nov. 30, 2021, 45 pages.

(Continued)

*Primary Examiner* — Shahid A Alam
(74) *Attorney, Agent, or Firm* — Amin, Turocy & Watson, LLP

(57) ABSTRACT

A system can to perform a replication of data from first computing equipment to second computing equipment, the data being stored as part of a path in a file system. The system can, from a replication policy for the replication, a priority sub-path of the path. The system can add a first set of files to a transfer queue comprising tree-walking the priority sub-path. The system can, after adding the first set of files, adding a second set of files to the transfer queue comprising tree-walking a portion of the path that is different from the priority sub-path. The system can replicate files in the transfer queue from the first computing equipment to the second computing equipment.

20 Claims, 10 Drawing Sheets

(56) References Cited

U.S. PATENT DOCUMENTS

| | | |
|---|---|---|
| 11,258,688 B2* | 2/2022 | Gell .................... G06F 16/1844 |
| 2007/0185852 A1 | 8/2007 | Erofeev |
| 2013/0124464 A1* | 5/2013 | Rank ....................... G06F 16/27 |
| | | 707/610 |
| 2019/0034453 A1* | 1/2019 | Jarvis .................... G06F 16/113 |
| 2019/0260658 A1* | 8/2019 | Gell .................... G06F 16/1844 |
| 2020/0349074 A1 | 11/2020 | Kucherov et al. |
| 2021/0152624 A1 | 5/2021 | Vaykole et al. |
| 2021/0181945 A1 | 6/2021 | Kumar et al. |
| 2021/0326358 A1 | 10/2021 | Seelemann, II et al. |
| 2022/0129152 A1 | 4/2022 | Adams et al. |

OTHER PUBLICATIONS

Gupta et al. "File Transfer Prioritization During Replication" U.S. Appl. No. 17/538,445, filed Nov. 30, 2021, 48 pages.

Notice of Allowance mailed Feb. 23, 2023 for U.S. Appl. No. 17/538,445, 54 pages.

Office Action mailed Dec. 22, 2023 for U.S. Appl. No. 17/538,486, 70 pages.

Notice of Allowance mailed Apr. 17, 2024 for U.S. Appl. No. 17/538,486, 90 pages.

\* cited by examiner

200

```
PROTECTED PATH 202: /USR/JDOE
PRIORITY SUB-PATH(S) 204:
    /USR/JDOE/SENSITIVE
    /USR/JDOE/SPECIAL
POLICY PRIORITY 206: NORMAL
FREQUENCY 208: DAILY
SOURCE SYSTEM 210: COMPUTER A
DESTINATION SYSTEM 212: COMPUTER B
```

DETERMINING, FROM A REPLICATION POLICY FOR A REPLICATION OF DATA FROM A FIRST DEVICE TO A SECOND DEVICE, WHEREIN THE DATA IS STORED AS PART OF A PATH IN A FILE SYSTEM, A PRIORITY SUB-PATH OF THE PATH 804

↓

ADDING A FIRST GROUP OF FILES TO A TRANSFER QUEUE BY TREE-WALKING THE PRIORITY SUB-PATH 806

↓

AFTER ADDING THE FIRST GROUP OF FILES, ADDING A SECOND GROUP OF FILES TO THE TRANSFER QUEUE BY TREE-WALKING A PORTION OF THE PATH THAT IS DIFFERENT FROM THE PRIORITY SUB-PATH 808

↓

REPLICATING FILES IN THE TRANSFER QUEUE FROM THE FIRST DEVICE TO THE SECOND DEVICE 810

FILE TRANSFER PRIORITIZATION DURING REPLICATION

BACKGROUND

Data replication can comprise a form of data protection where data from a source computer is duplicated to a destination computer.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can to perform a replication of data from first computing equipment to second computing equipment, the data being stored as part of a path in a file system. The system can, from a replication policy for the replication, a priority sub-path of the path. The system can add a first set of files to a transfer queue comprising tree-walking the priority sub-path. The system can, after adding the first set of files, adding a second set of files to the transfer queue comprising tree-walking a portion of the path that is different from the priority sub-path. The system can replicate files in the transfer queue from the first computing equipment to the second computing equipment.

An example method can comprise determining, by a system comprising a processor, and from a replication policy for a replication of data from a first device to a second device, wherein the data is stored as part of a path in a file system, a priority sub-path of the path. The method can further comprise adding, by the system, a first group of files to a transfer queue by tree-walking the priority sub-path. The method can further comprise, after adding the first group of files, adding, by the system, a second group of files to the transfer queue by tree-walking a portion of the path that is different from the priority sub-path. The method can further comprise replicating, by the system, files in the transfer queue from the first device to the second device.

An example non-transitory computer-readable medium can comprise instructions that, in response to execution, cause a system comprising a processor to perform operations. These operations can comprise determining, based on a replication policy for a replication of data from a first computer to a second computer, a priority sub-path of a file system path to be replicated. These operations can comprise determining to replicate first files in the priority sub-path first among the data. These operations can comprise determining to replicate second files that is within the file system path and outside of the priority sub-path after replicating the first files. These operations can comprise replicating the first files and the second files from the first computer to the second computer.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 2 illustrates an example system architecture for a replication policy that can facilitate file transfer prioritization during replication, in accordance with an embodiment of this disclosure;

FIG. 8 illustrates another example process flow that can facilitate file transfer prioritization during replication, in accordance with an embodiment of this disclosure;

DETAILED DESCRIPTION

Overview

Figure 1:
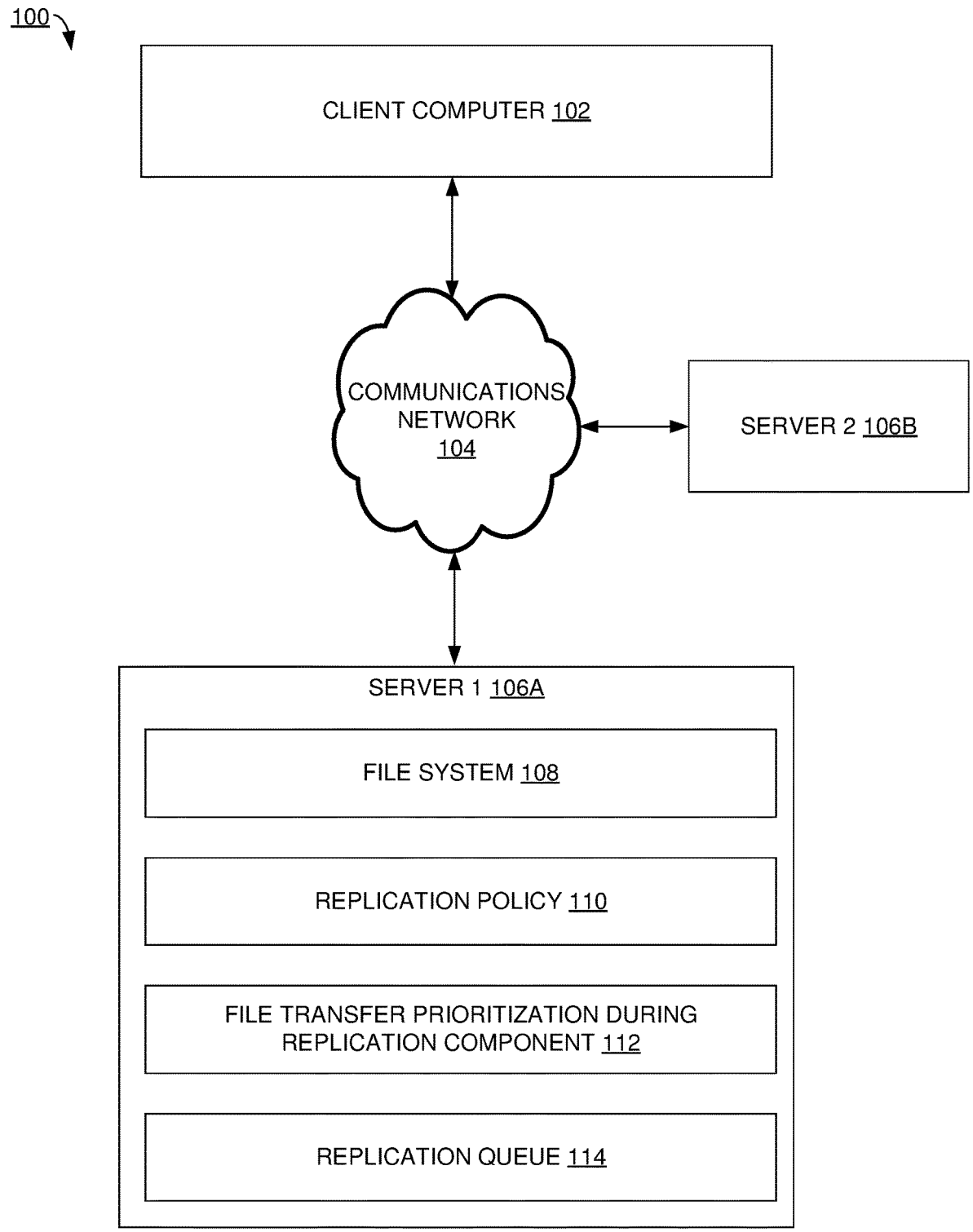
FIG. 1 illustrates an example system architecture that can facilitate file transfer prioritization during replication, in accordance with an embodiment of this disclosure.

Storage, such as network attached storage (NAS), can provide a replication facility for disaster recovery. In some examples, a replication recurring job can be defined to protect data involved in one or more Recovery Point Objectives (RPOs) in a disaster recovery plan.

There can be multiple files to migrate in a replication job execution. Different users can edit these files between two subsequent job runs of one replication policy. The users that edit a file can change over time. Different users can be assigned different levels of criticality as far as meeting RPOs. Additionally, different applications with varied criticality can write files to these storage systems.

In some examples, a general queue of files can be maintained while transferring a file from a source to target storage. This queue can be populated as a replication job traverses through a directory structure under replication. Another thread can keep reading file information from the queue and start replication tasks.

The examples described herein generally involve the use of queues (e.g., a priority queue and a normal queue). It can be appreciated that a queue can generally be implemented in a variety of ways, such as with a variety of data structures (e.g., a linked list data structure, or a circular buffer data structure). A queue can generally order elements such that those elements can be retrieved (or transferred) in that order.

In some examples, a list of files to transfer for replication can be maintained, along with a respective priority for each file. Files can be accessed from the list by querying a component that maintains the list for, e.g., a file with a highest priority among those files presently in the list. In other examples, the querying entity can specify a priority being requested, and that entity can request files with the highest priority until no more are present, then files with the next highest priority until no more are present, etc.

In some examples, a queue does not strictly order the files being replicated. Rather, the queue can order files based on their priority, and within a particular priority (e.g., high priority), files are not ordered. That is, it can be that higher priority files are transferred before lower priority files, but that there is not a specific order of transferring files within a specific priority level.

In some prior approaches, while populating the queue, a file priority based on user criticality is not considered. This can mean that a file written by a critical user can be replicated to the target at the end of a replication job.

There can be scenarios where a partial replication (e.g., a few files are replicated out of identified files for replication) can be implemented. For example, this can be implemented in a home directory workflow, where an administrator wants to replicate home directory files across different users.

There can be a possibility that during a replication job, a source storage system can be hit by a disaster, and only a few of the identified files for replication will be successfully transferred to the target storage system. In this situation, where a priority of files is not maintained during replication, then it can be that more critical files can have less protection.

The present techniques can be implemented to maintain a priority of files during replication based on a criticality of an associated user or application.

A solution to the problem of losing critical files can be to make a data protection policy aware of priority directories or priority files. In some examples, this can be achieved by prioritizing a sub-path or file, e.g., directly marking a sub-path or a file as a priority. In some examples, this can be achieved by prioritizing a user, e.g., marking a user as a priority user and indirectly identifying priority files based on those files being associated with a priority user.

Prioritizing a sub-path or file can be implemented as follows. An example implementation can involve directly providing names of sub-paths (in a data protection policy) that are a higher priority than other sub-paths.

A policy can define information such as a protected path, a priority of the policy, when to run a copy-job for the policy, a source system, a target system, etc. The policy can also define priority sub-paths.

Take an example where there are 1,000 sub-paths in a protected path. Where a priority sub-path is not empty, a copy-job can first tree-walk in the priority sub-paths. Once the priority sub-paths are handled, the copy job can move on to other sub-paths in a given protected path. This approach can ensure that files in the priority sub-paths are transferred first in a given replication.

Some replications can be performed on a snapshot with metadata about the snapshot (e.g., creation and expiry time, expiry action, subsets, state, etc.). Additional information about a replication can involve when to create a dataset (e.g., a creation policy that accepts a schedule and a source account ID), when to replicate the dataset and the source and destination (e.g., a copy policy that accepts a schedule and source and target account IDs), and identifying source and target computers (e.g., account details that accept a Uniform Resource Identifier (URI) or Internet Protocol (IP) address for accessing each computer). This information can be stored in a key-value store (KVS).

A scheduler can keep track of a current time and when to execute a next replication policy. When it is time for a policy to run, a job corresponding to the policy can be created.

In examples that implement replication on a computing cluster that comprises a plurality of nodes, replication can be implemented as follows. One node can serve as a scheduler. Where the node serving as the scheduler goes down, other nodes can race to become the scheduler. Each node on a cluster can have a job-runner. A job created by the scheduler can be picked up by any job-runner, which can create a first task for the job (which can be referred to as a root-task), and monitor the job until the job comes to an end.

Each node on a cluster can have a task-runner, and tasks for any job can be picked up by any task-runner.

Tasks can be created on a KVS (with indexing, which can be referred to as a key-value index (KVI)). This indexing can help a task-runner to fetch tasks based on state and priority. A task-runner can query for tasks with pending state and high priority. If there are no high priority tasks, the task-runner can then query for tasks with pending state and medium priority (and then pending state and low priority).

Every node on the cluster has a task-runner. The tasks for any job could be picked by any task-runner.

In some prior approaches, the priority for every task for one job is the same as the priority of the job.

The present techniques can be implemented to better prioritize tasks. Using the high/medium/low priority framework, a new priority—highest—can be implemented. In such examples, even if a job has a high priority (meaning that its tasks also have a high priority), there can be highest priority tasks that are prioritized above high priority tasks.

Priority files can be identified as part of priority sub-paths in a policy (such as system architecture 200 of FIG. 2). In such examples, a root-task can first read the priority sub-paths from the policy and create file-transfer-tasks for those sub-paths. Then, the root-task can create file-transfer-tasks for other portions of the replication path.

Once the root-task creates highest priority tasks for each priority file or sub-path mentioned in the policy, a hash-table containing names of all the priority files and/or sub-directories can be generated.

Once the priority tasks are processed, a tree walk can be performed for transferring non-priority files. Before creating a task, the hash-table can be accessed. If the file name or sub-directory is present in the hash-table, it can be that the task for that file/sub-directory is not created as it has already been processed in the current instance of replication.

Example Architectures

FIG. 1 illustrates an example system architecture 100 that can facilitate file transfer prioritization during replication, in accordance with an embodiment of this disclosure.

System architecture 100 comprises client computer 102, communications network 104, server 1 106A, and server 2 106B. In turn, server 1 106A comprises file system 108, replication policy 110, file transfer prioritization during replication component 112, and replication queue 114.

Client computer 102 can access files stored in file system 108, via communications network 104. As the data in file system 108 is modified, it can be periodically replicated to server 2 106B to provide data protection. Replication can be managed by file transfer prioritization during replication component 112, which can follow the replication parameters defined by replication policy 110, and use replication queue 114 as a queue of files to be transferred in a current instance of a replication.

Replication policy 110 can be similar to system architecture 200 of FIG. 2. File system 108 can be similar to system architecture 300 of FIG. 3 (and/or the system architectures of FIGS. 4-6).

Replication queue 114 can comprise an ordered queue so that an order in which files to transfer are inserted indicates an order in which those files will be replicated during the current instance of replication. In other examples, replication queue 114 can comprise a data structure that keeps track of files to replicate and their associated priorities. A component that transfers files to the target computer can access replication queue 114 for a file that has a highest priority among files presently in replication queue 114, and in that manner, order a transfer of files according to their priority.

Figure 10:
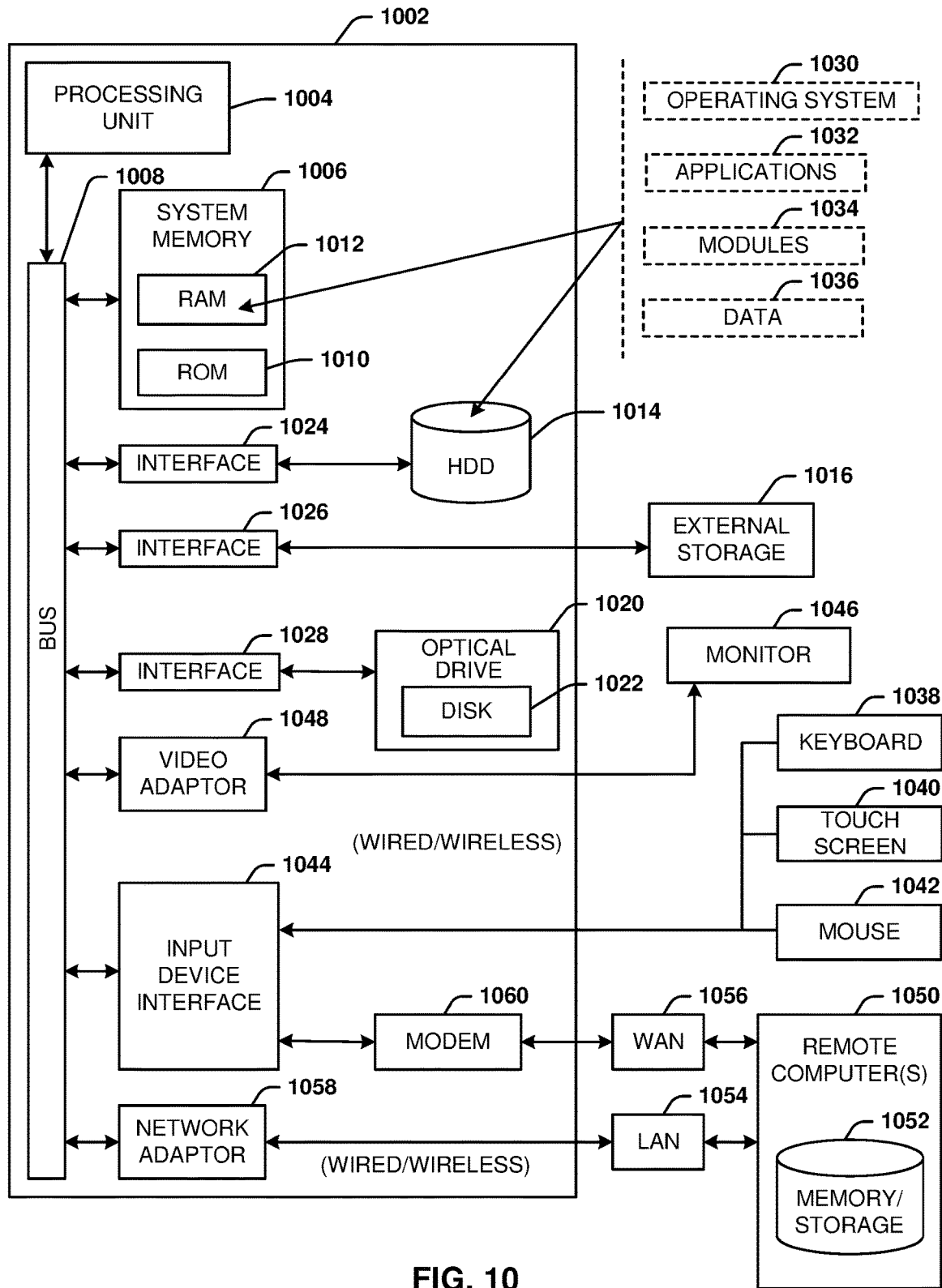
FIG. 10 illustrates an example block diagram of a computer operable to execute an embodiment of this disclosure.

Each of client computer 102, server 1 106A, and/or server 2 106B can be implemented with part(s) of computing environment 1000 of FIG. 10. Communications network 104 can comprise a computer communications network, such as the INTERNET.

Figure 7:
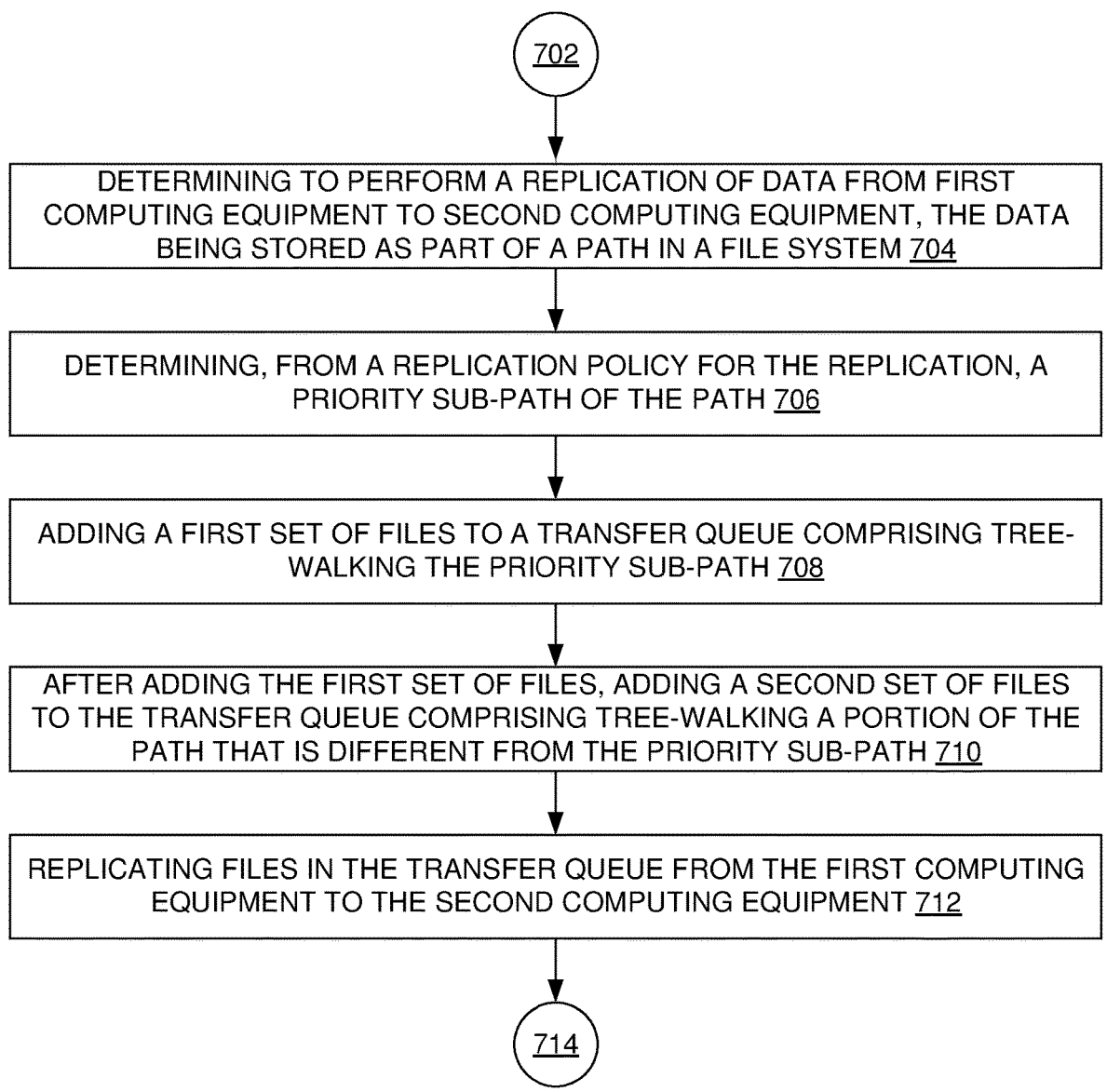
FIG. 7 illustrates an example process flow that can facilitate file transfer prioritization during replication, in accordance with an embodiment of this disclosure.
Figure 9:
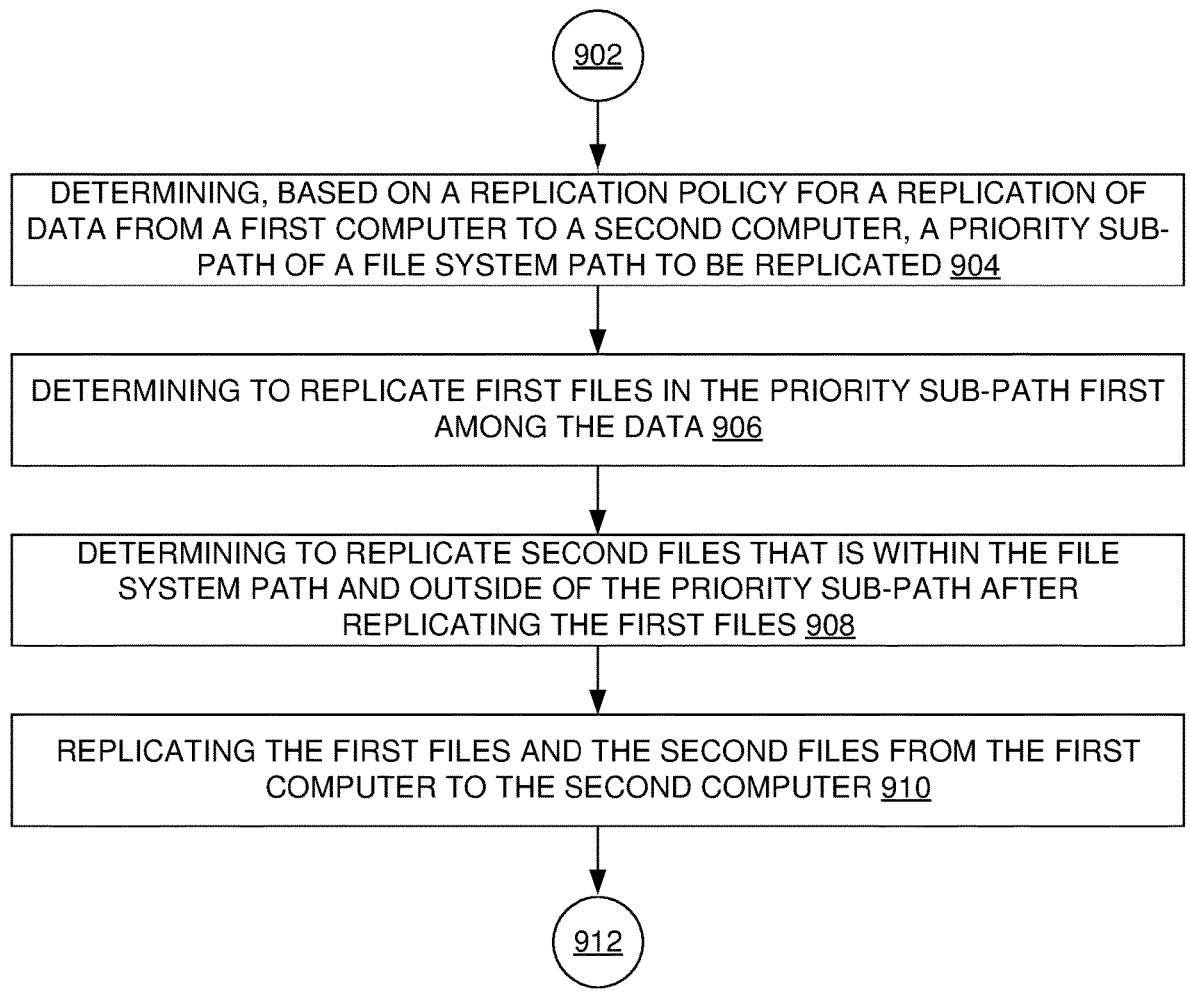
FIG. 9 illustrates another example process flow that can facilitate file transfer prioritization during replication, in accordance with an embodiment of this disclosure.

In some examples, file transfer prioritization during replication component 112 can implement part(s) of the process flows of FIGS. 7-9 to facilitate file transfer prioritization during replication.

It can be appreciated that system architecture 100 is one example system architecture for file transfer prioritization during replication, and that there can be other system architectures that facilitate file transfer prioritization during replication.

FIG. 2 illustrates an example system architecture 200 for a replication policy that can facilitate file transfer prioritization during replication, in accordance with an embodiment of this disclosure. System architecture 200 can comprise a replication policy, similar to replication policy 110 of FIG. 1. It can be appreciated that there can be other example replication policies that include more or less information than depicted in system architecture 200.

System architecture 200 comprises protected path 202, priority sub-path(s) 204, policy priority 206, frequency 208, source system 210, and destination system 212. Protected path 202 identifies /usr/jdoe as a path in file system 108 to replicate. Priority sub-path(s) 204 identifies some number of sub-paths within protected path 202 for which files will be replicated with a higher priority than other files in the protected path. Here, priority sub-path(s) identifies /usr/jdoe/sensitive and /usr/jdoe/special. In some examples, priority files can be identified.

Frequency 208 identifies a frequency with which to perform a replication for the replication policy of system architecture 200, and here is defined as daily replications. Source system 210 identifies a computer that stores data that is being replicated, which here is computer A (e.g., server 1 106A). Destination system 212 identifies a computer where the data is being transferred as part of the replication, which here is computer B (e.g., server 2 106B).

Figure 3:
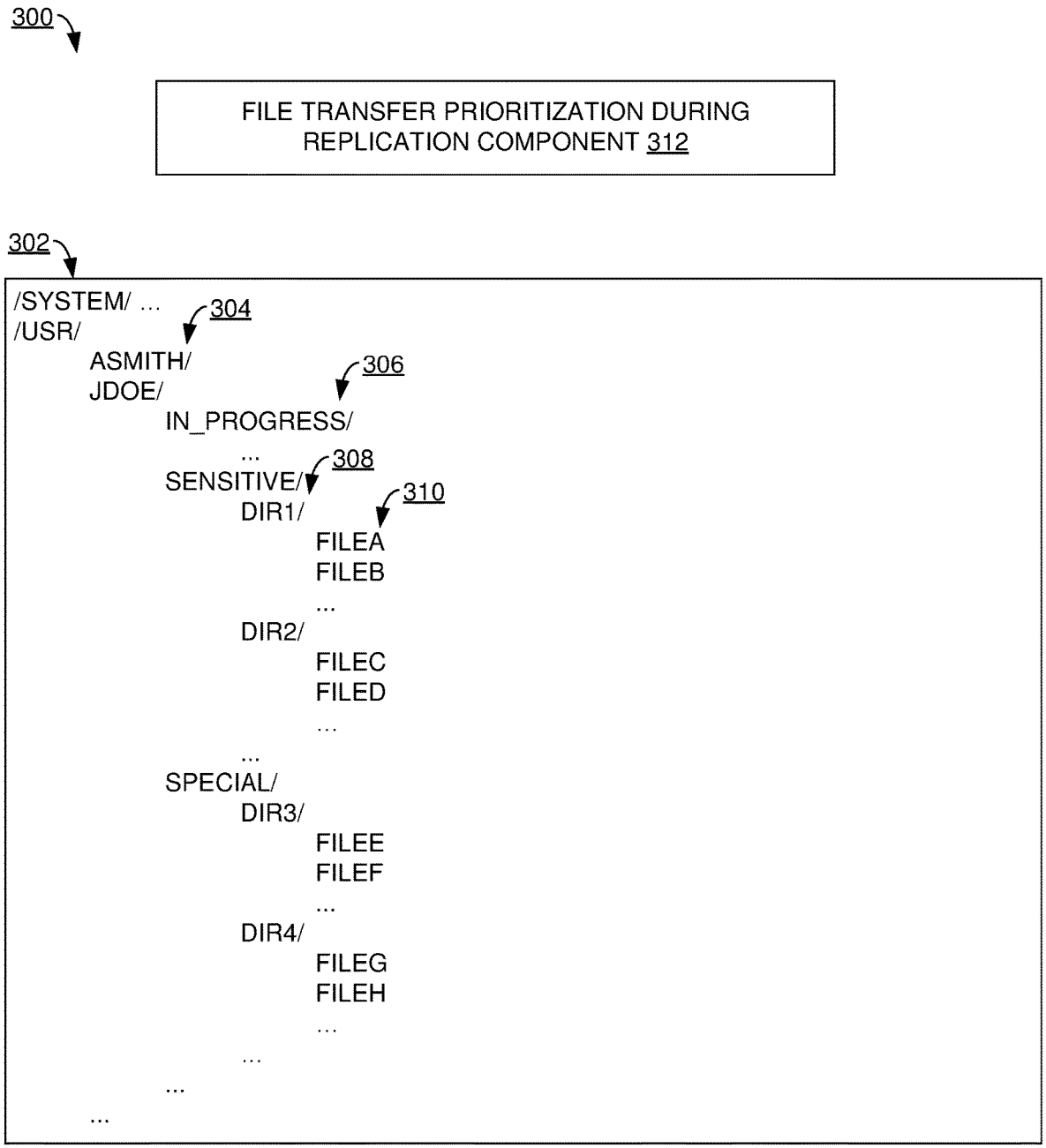
FIG. 3 illustrates an example system architecture for a file system that can facilitate file transfer prioritization during replication, in accordance with an embodiment of this disclosure.

FIG. 3 illustrates an example system architecture 300 for a file system that can facilitate file transfer prioritization during replication, in accordance with an embodiment of this disclosure. System architecture comprises file system 302 (which can be similar to file system 108 of FIG. 1), and file transfer prioritization during replication component 312 (which can be similar to file transfer prioritization during replication component 112).

File system 302 comprises a hierarchical file system of folders (e.g., /system/ and /usr/) and files (e.g., fileA and fileB). Layer 1 304 of file system 304 identifies specific user folders—/usr/asmith/ and /usr/jdoe/). Layer 2 306 is a sub-layer of layer 1 304, and illustrates folders contained within /usr/jdoe. Layer 3 308 is a sub-layer of layer 2 306, and illustrates folders contained within /usr/jdoe/sensitive. Layer 4 310 is a sub-layer of layer 3 308, and illustrates files contained within /usr/jdoe/sensitive/dir1.

A priority sub-path can identify a sub-path of a replication path, and can include all sub-sub-paths and files of that sub-path. For example, where the replication path is /usr/jdoe, a priority sub-path can be /usr/jdoe/sensitive, and that priority sub-path can include /usr/jdoe/sensitive/dir1, /usr/jdoe/sensitive/dir2, /usr/jdoe/sensitive/dir1/fileA, /usr/jdoe/sensitive/dir1/fileB, etc.

In some examples, in a tree walk, a root-task can perform a directory-level walk for a first directory in a path. For each file in the directory, a file-transfer-task can be created, and for each sub-directory, a dir-transfer-task can be created. File-transfer-tasks can transfer the files and end. Dir-transfer-tasks can perform a walk-through in the assigned sub-directory and create more file-transfer-tasks and dir-transfer-tasks. With this approach, dir-transfer-tasks can create more tasks until there are no more sub-directories to analyze.

Take an example file system where the root directory of a replication path contains, directory dir-home, directory dir-data, file file-a, and file file-b. A root task can first create two dir-transfer-tasks—one for dir-home ("T1") and one for dir-data ("T2"). The root task can also create two file-transfer-tasks—one for file-a and one for file-b.

Where dir-home contains directory dir-subdir, file file-x, and file file-y, T1 can create a dir-transfer-task for dir-subdir, and file-transfer-tasks for each of file-x and file-y. Where dir-data contains file file-p and file file-q, T2 can create file-transfer-tasks for file-p and file-q (and no dir-transfer-tasks because dir-data lacks a sub-directory).

Figure 4:
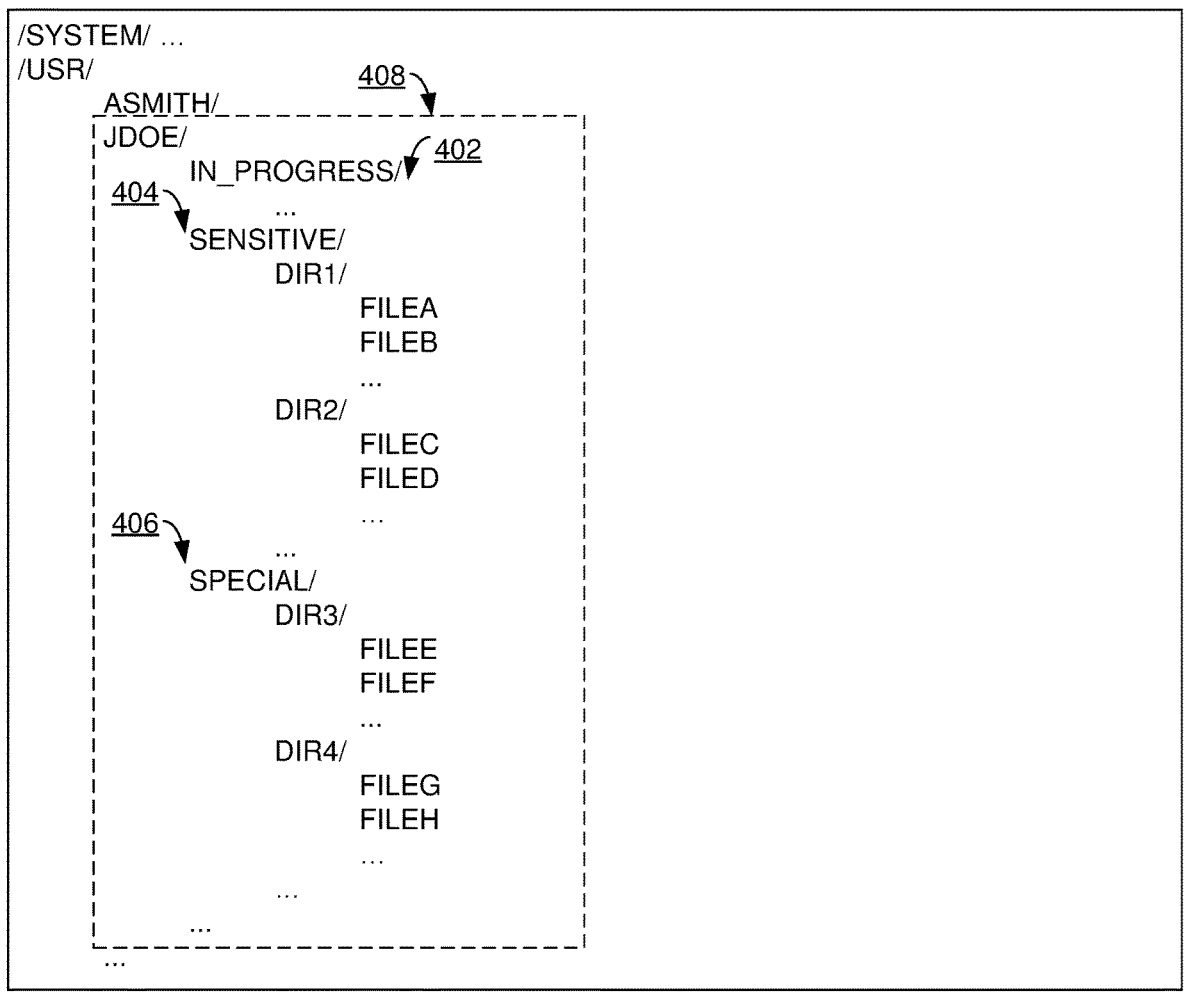
FIG. 4 illustrates an example system architecture for tree walking a file system that can facilitate file transfer prioritization during replication, in accordance with an embodiment of this disclosure.

FIG. 4 illustrates an example system architecture 400 for tree walking a file system that can facilitate file transfer prioritization during replication, in accordance with an embodiment of this disclosure.

System architecture depicts a file system (which can be similar to file system 108 of FIG. 1), and comprises path 408, sub-path 402, sub-path 404, and sub-path 406. Path 408 can be tree-walked by visiting sub-path 402 (folder in_progress) and all of its subfolders and files; then visiting sub-path 404 (folder sensitive), and all of its folders and files (e.g., folder dir/1, file dir1/fileA, etc.); and then visiting sub-path 406 (folder special), and all of its folders and files.

File transfer prioritization during replication component 112 of FIG. 1 can tree-walk path 408 to facilitate file transfer prioritization during replication.

Figure 5:
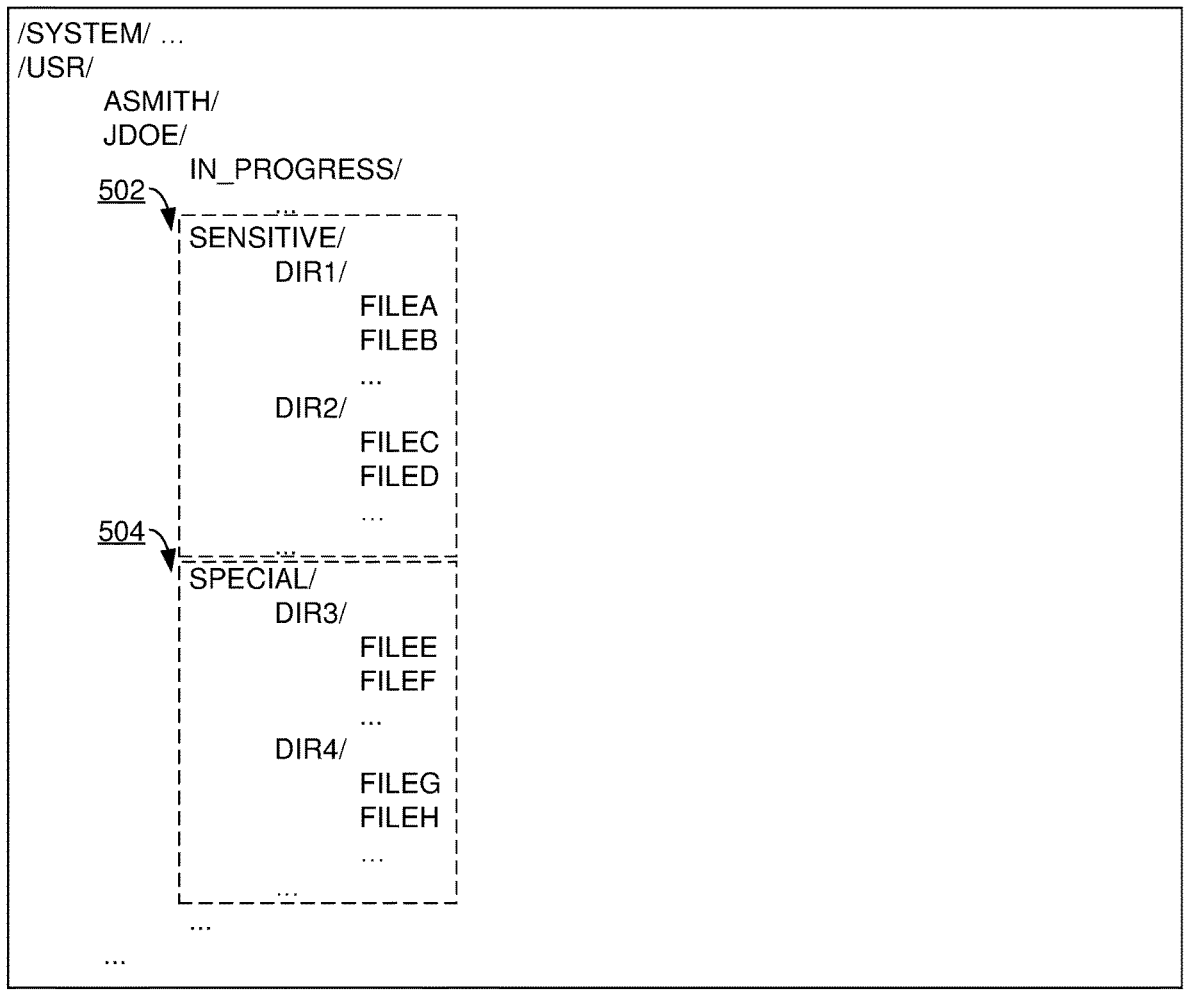
FIG. 5 illustrates another example system architecture for tree walking a file system that can facilitate file transfer prioritization during replication, in accordance with an embodiment of this disclosure.

FIG. 5 illustrates another example system architecture 500 for tree walking a file system that can facilitate file transfer prioritization during replication, in accordance with an embodiment of this disclosure.

System architecture 500 depicts a file system (which can be similar to file system 108 of FIG. 1), and comprises priority sub-path 502 and priority sub-path 504. Each of priority sub-path 502 and priority sub-path 504 can be a priority sub-path that is identified in priority sub-path(s) 204 of FIG. 2.

As part of tree-walking a path (e.g., path 408 of FIG. 4), file transfer prioritization during replication component 112 of FIG. 1 can first tree-walk priority sub-path 502 and priority sub-path 504, and add files identified in these priority sub-paths (e.g., fileA) to replication queue 114 for replication.

After tree-walking the priority sub-paths, file transfer prioritization during replication component 112 can then tree-walk other portions of the path to identify non-priority files.

Figure 6:
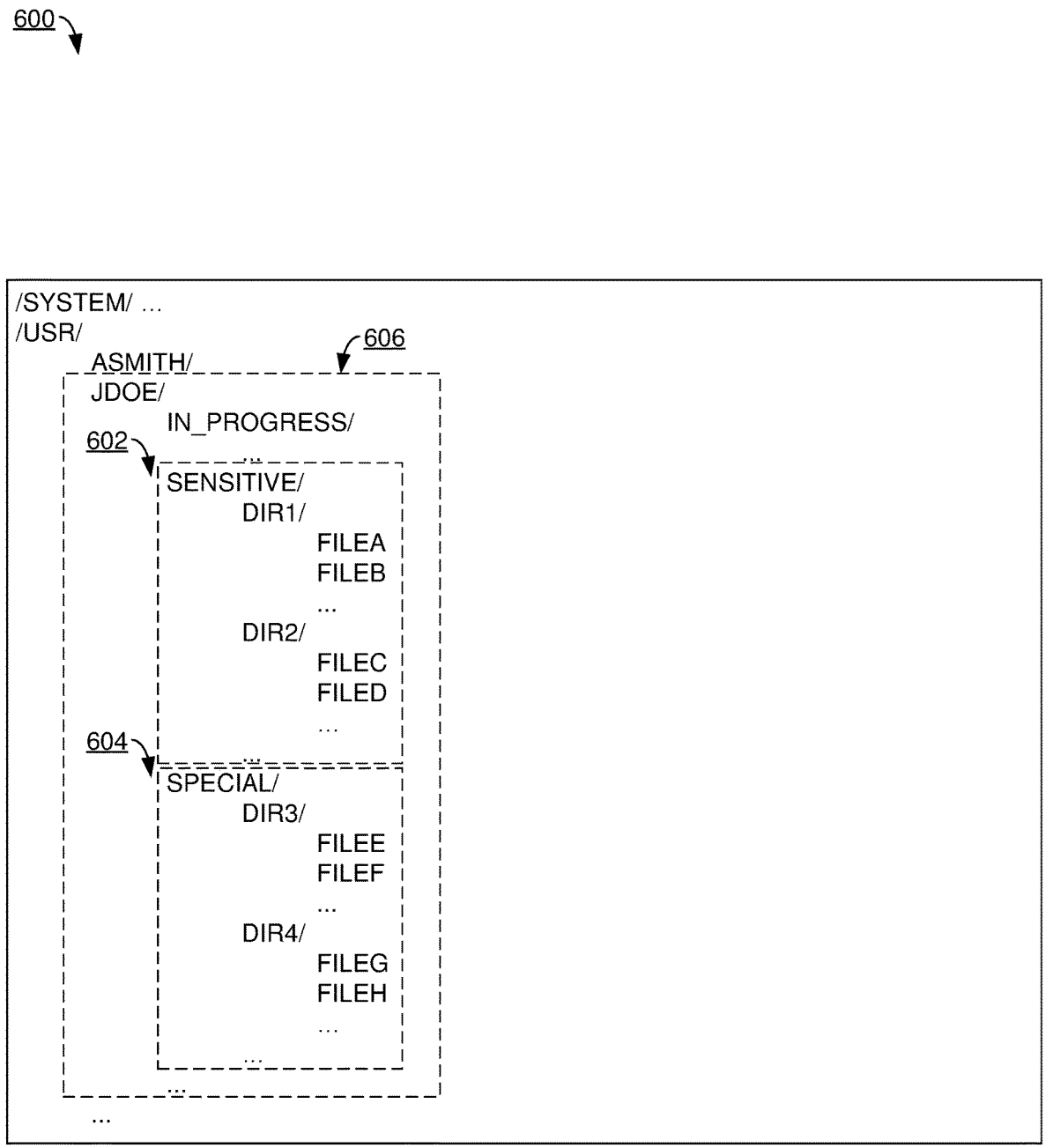
FIG. 6 illustrates another example system architecture for tree walking a file system that can facilitate file transfer prioritization during replication, in accordance with an embodiment of this disclosure.

FIG. 6 illustrates another example system architecture 600 for tree walking a file system that can facilitate file transfer prioritization during replication, in accordance with an embodiment of this disclosure.

System architecture 600 depicts a file system (which can be similar to file system 108 of FIG. 1), and comprises path 606, priority sub-path 602 and priority sub-path 604. Each of priority sub-path 602 and priority sub-path 604 can be a priority sub-path that is identified in priority sub-path(s) 204 of FIG. 2.

In some examples, path 606 can be a replication path (such as identified in protected path 202 of FIG. 2). Within path 606 are priority sub-path 602 and priority sub-path 604. In performing a replication on path 606, file transfer prioritization during replication component 112 of FIG. 1 can first analyze priority sub-path 602 and priority sub-path 604 for files to replicate (and add them to replication queue 114), and then analyze portions of path 606 that are outside of the priority sub-paths, such as /usr/jdoe/in_progress/.

Example Process Flows

FIG. 7 illustrates an example process flow 700 that can facilitate file transfer prioritization during replication, in accordance with an embodiment of this disclosure. In some examples, one or more embodiments of process flow 700 can be implemented by file transfer prioritization during replication component 112 of FIG. 1, or computing environment 1000 of FIG. 10.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 800 of FIG. 8, and/or process flow 900 of FIG. 9.

Process flow 700 begins with 702, and moves to operation 704. Operation 704 depicts determining to perform a replication of data from first computing equipment to second computing equipment, the data being stored as part of a path in a file system. This replication can be from server 1 106A of FIG. 1 to server 2 106B, and the data can be stored in file system 108.

After operation 704, process flow 700 moves to operation 706.

Operation 706 depicts determining, from a replication policy for the replication, a priority sub-path of the path. This replication policy can be replication policy 110 of FIG. 1, and the priority sub-path can be a priority sub-path of priority sub-path(s) 204 of FIG. 2.

In some examples, the replication policy identifies the path in the file system, a priority of the replication, a time to perform the replication, the first computing equipment, or the second computing equipment. That is, a replication policy can identify various types of information, such as described with respect to system architecture 200 of FIG. 2.

After operation 706, process flow 700 moves to operation 708.

Operation 708 depicts adding a first set of files to a transfer queue comprising tree-walking the priority sub-path. For example, where the priority sub-path is /usr/jdoe/sensitive, this portion of file system 108 of FIG. 1 (e.g., similar to example system architecture 300 of FIG. 3) can be traversed, and where files are encountered, they can be added to replication queue 114 for replication.

In some examples, tree-walking the priority sub-path comprises traversing a hierarchical structure of the priority sub-path across each file of the priority sub-path, and adding each file encountered while traversing the hierarchical structure of the priority sub-path to the transfer queue. That is, the hierarchical structure can be similar to that of system architecture 300 of FIG. 3.

After operation 708, process flow 700 moves to operation 710.

Operation 710 depicts, after adding the first set of files, adding a second set of files to the transfer queue comprising tree-walking a portion of the path that is different from the priority sub-path. Using the example replication policy of system architecture 200, this can involve first adding files in /usr/jdoe/sensitive and /usr/jdoe/special to replication queue 114 of FIG. 1. After adding those files, then other files in /usr/jdoe can be added to replication queue 114.

After operation 710, process flow 700 moves to operation 712.

Operation 712 depicts replicating files in the transfer queue from the first computing equipment to the second computing equipment.

In some examples, the priority sub-path is a first priority sub-path, and operation 712 comprises determining, from the replication policy, a second priority sub-path of the path, and adding a third set of files to the transfer queue by tree-walking the second priority sub-path, wherein adding the second set of files to the transfer queue is performed after adding the third set of files to the transfer queue. That is, a replication policy can have multiple priority sub-paths, such as in system architecture 200 with both /usr/jdoe/sensitive and /usr/jdoe/special. In such examples, each of these priority sub-paths can be processed and their files transferred before transferring files from outside of priority sub-paths.

In some examples, the second set of files has a lower priority for replication than the first set of files. That is, there can be prioritization in transferring files during replication. The first set of files can be files in a priority sub-path, and the second set of files can be files outside of a priority sub-path. So, the first set of files can be prioritized for replication before the second set of files.

In some examples, the replication is a first replication, the data is first data, the path is a first path, the replication policy is a first replication policy, the priority sub-path is a first priority sub-path, and operation 712 comprises determining to perform a second replication of second data stored in a second path, and, in response to determining that a second replication policy for the second replication omits identifying a second priority sub-path, replicating a third set of files of the second path in an order encountered by tree-walking the second path. That is, it can be that a priority sub-path (e.g., priority sub-path(s) 204 of FIG. 2) is optional in a replication policy (e.g., system architecture 200). In examples where a priority sub-path is not defined, a replication without regard to priority of files can be performed.

In some examples, operation 712 comprises beginning the replicating of the files in the transfer queue in response to determining that the first set of files is added to the transfer queue, and before adding the second set of files to the transfer queue. That is, replication from replication queue 114 of FIG. 1 to server 2 106B can begin before all files for replication have been identified.

After operation 712, process flow 700 moves to 714, where process flow 700 ends.

FIG. 8 illustrates another example process flow 800 that can facilitate file transfer prioritization during replication, in accordance with an embodiment of this disclosure. In some examples, one or more embodiments of process flow 800 can be implemented by file transfer prioritization during replication component 112 of FIG. 1, or computing environment 1000 of FIG. 10.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 700 of FIG. 7, and/or process flow 900 of FIG. 9.

Process flow 800 begins with 802, and moves to operation 804. Operation 804 depicts determining, from a replication policy for a replication of data from a first device to a second device, wherein the data is stored as part of a path in a file system, a priority sub-path of the path. In some examples, operation 804 can be implemented in a similar manner as operations 704-706 of FIG. 7.

In some examples, the path comprises multiple sub-paths, including the priority sub-path. That is, a path in a replication policy can comprise multiple sub-paths. Using the example of system architecture 300 of FIG. 3, the path can be/usr/jdoe, and sub-paths can be, /usr/jdoe/sensitive, /usr/jdoe/sensitive/dir1, etc.

After operation 804, process flow 800 moves to operation 806.

Operation 806 depicts adding a first group of files to a transfer queue by tree-walking the priority sub-path. In some examples, operation 806 can be implemented in a similar manner as operation 708 of FIG. 7.

In some examples, tree-walking the priority sub-path comprises identifying each file contained within the priority sub-path, and adding each file contained within the priority sub-path to the transfer queue.

After operation 806, process flow 800 moves to operation 808.

Operation 808 depicts, after adding the first group of files, adding a second group of files to the transfer queue by tree-walking a portion of the path that is different from the priority sub-path. In some examples, operation 808 can be implemented in a similar manner as operation 710 of FIG. 7.

In some examples, the priority sub-path is a first priority sub-path, the replication policy identifies a second priority sub-path of the path, and operation 808 comprises adding a third group of files contained within the second priority sub-path to the transfer queue before adding the second group of files to the transfer queue. That is, there can be multiple priority sub-paths, and each of these priority sub-paths can be processed with their respective files replicated before files outside of the priority sub-paths are transferred.

In some examples, a first thread adds files of the first group of files to a priority queue from which files are replicated concurrently with a second thread adding files of the third group of files to the priority queue. That is, in some examples, multiple threads can tree walk respective priority sub-paths.

In some examples, the first priority sub-path and the second priority sub-path are sequentially tree walked based on an order by which the replication policy identifies the first priority sub-path and the second priority sub-path. That is, priority sub-paths can be evaluated in an order they are presented in a replication policy. Applying this to the example of system architecture 200 of FIG. 2, /usr/jdoe/ sensitive would be evaluated before /usr/jdoe/special, and so the files of /usr/jdoe/sensitive would be replicated before the files of /usr/jdoe/special.

In some examples, the portion of the path that is different from the priority sub-path omits the priority sub-path. That is, in some examples, files of the priority sub-path are evaluated, and then files outside of the priority sub-path are evaluated. And, files of the priority sub-path are not evaluated twice in one instance of performing a replication.

After operation 808, process flow 800 moves to operation 810.

Operation 810 depicts replicating files in the transfer queue from the first device to the second device. In some examples, operation 810 can be implemented in a similar manner as operation 712 of FIG. 7.

After operation 810, process flow 800 moves to 812, where process flow 800 ends.

FIG. 9 illustrates another example process flow 900 that can facilitate file transfer prioritization during replication, in accordance with an embodiment of this disclosure. In some examples, one or more embodiments of process flow 900 can be implemented by file transfer prioritization during replication component 112 of FIG. 1, or computing environment 1000 of FIG. 10.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 700 of FIG. 7, and/or process flow 800 of FIG. 8.

Process flow 900 begins with 902, and moves to operation 904. Operation 904 depicts determining, based on a replication policy for a replication of data from a first computer to a second computer, a priority sub-path of a file system path to be replicated. In some examples, operation 904 can be implemented in a similar manner as operations 704-706 of FIG. 7.

In some examples, the replication policy identifies the file system path, a priority of the replication, a time to perform the replication, the first computer, or the second computer. That is, the replication policy can identify information similar to that of system architecture 200 of FIG. 2.

After operation 904, process flow 900 moves to operation 906.

Operation 906 depicts determining to replicate first files in the priority sub-path first among the data. In some examples, operation 906 can be implemented in a similar manner as operation 708 of FIG. 7.

After operation 906, process flow 900 moves to operation 908.

Operation 908 depicts determining to replicate second files that is within the file system path and outside of the priority sub-path after replicating the first files. In some examples, operation 908 can be implemented in a similar manner as operation 710 of FIG. 7.

In some examples, the second files have a lower priority for replication than the first files. That is, the second files can be those files not identified by a priority sub-path so can be replicated after priority files are replicated.

After operation 908, process flow 900 moves to operation 910.

Operation 910 depicts replicating the first files and the second files from the first computer to the second computer.

In some examples, operation 910 can be implemented in a similar manner as operation 712 of FIG. 7.

In some examples, the priority sub-path is a first priority sub-path, the replication policy identifies a second priority sub-path, and operation 910 comprises determining to replicate third files that corresponds to the second priority sub-path before replicating the second files, and replicating the third files. That is, a replication policy can identify multiple priority sub-paths.

In some examples, the replication is a first replication, the file system path is a first file system path, the replication policy is a first replication policy, the priority sub-path is a first priority sub-path, operation 910 comprises, in response to determining that a second replication policy for a second replication omits identifying a second priority sub-path, replicating third files of a second file system path of the second replication policy in an order encountered by tree-walking the second path. That is, there can be replication policies that do not identify a priority sub-path, and in such cases, files can be replicated without regard to different files having a different priority.

In some examples, operation 910 comprises beginning the replicating of the first files before identifying the second files. That is, replication can begin once a file for replication has been identified, rather than waiting until all files for replication have been identified.

After operation 910, process flow 900 moves to 912, where process flow 900 ends.

Example Operating Environment

In order to provide additional context for various embodiments described herein, FIG. 10 and the following discussion are intended to provide a brief, general description of a suitable computing environment 1000 in which the various embodiments of the embodiment described herein can be implemented.

For example, parts of computing environment 1000 can be used to implement one or more embodiments of client computer 102 and/or server 106 of FIG. 1.

In some examples, computing environment 1000 can implement one or more embodiments of the process flows of FIGS. 7-9 to facilitate file transfer prioritization during replication.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multiprocessor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a nonvolatile storage such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples, and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/ communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
      determining to perform a replication of data from first computing equipment to second computing equipment, the data being stored as part of a path in a file system;
      determining, from a replication policy for the replication, a priority sub-path of the path;
      adding a first set of files to a transfer queue comprising tree-walking the priority sub-path;
      after adding the first set of files, adding a second set of files to the transfer queue comprising tree-walking a portion of the path that is different from the priority sub-path; and
      replicating files in the transfer queue from the first computing equipment to the second computing equipment.

2. The system of claim 1, wherein tree-walking the priority sub-path comprises:
   traversing a hierarchical structure of the priority sub-path across each file of the priority sub-path; and
   adding each file encountered while traversing the hierarchical structure of the priority sub-path to the transfer queue.

3. The system of claim 1, wherein the priority sub-path is a first priority sub-path, and wherein the operations further comprise:
   determining, from the replication policy, a second priority sub-path of the path;
   adding a third set of files to the transfer queue by tree-walking the second priority sub-path; and
   wherein adding the second set of files to the transfer queue is performed after adding the third set of files to the transfer queue.

4. The system of claim 1, wherein the second set of files has a lower priority for replication than the first set of files.

5. The system of claim 1, wherein the replication is a first replication, wherein the data is first data, wherein the path is a first path, wherein the replication policy is a first replication policy, wherein the priority sub-path is a first priority sub-path, and wherein the operations further comprise:
   determining to perform a second replication of second data stored in a second path; and
   in response to determining that a second replication policy for the second replication omits identifying a second priority sub-path, replicating a third set of files of the second path in an order encountered by tree-walking the second path.

6. The system of claim 1, wherein the operations further comprise:
   beginning the replicating of the files in the transfer queue in response to determining that the first set of files is added to the transfer queue, and before adding the second set of files to the transfer queue.

7. The system of claim 1, wherein the replication policy identifies the path in the file system, a priority of the replication, a time to perform the replication, the first computing equipment, or the second computing equipment.

8. A method, comprising:
   determining, by a system comprising a processor, and from a replication policy for a replication of data from a first device to a second device, wherein the data is stored as part of a path in a file system, a priority sub-path of the path;
   adding, by the system, a first group of files to a transfer queue by tree-walking the priority sub-path;
   after adding the first group of files, adding, by the system, a second group of files to the transfer queue by tree-walking a portion of the path that is different from the priority sub-path; and
   replicating, by the system, files in the transfer queue from the first device to the second device.

9. The method of claim 8, wherein the path comprises multiple sub-paths, including the priority sub-path.

10. The method of claim 8, wherein tree-walking the priority sub-path comprises:
    identifying, by the system, each file contained within the priority sub-path; and
    adding, by the system, each file contained within the priority sub-path to the transfer queue.

11. The method of claim 8, wherein the priority sub-path is a first priority sub-path, wherein the replication policy identifies a second priority sub-path of the path, and further comprising:
    adding, by the system, a third group of files contained within the second priority sub-path to the transfer queue before adding the second group of files to the transfer queue.

12. The method of claim 11, wherein a first thread adds files of the first group of files to a priority queue from which files are replicated concurrently with a second thread adding files of the third group of files to the priority queue.

13. The method of claim 11, wherein the first priority sub-path and the second priority sub-path are sequentially tree walked based on an order by which the replication policy identifies the first priority sub-path and the second priority sub-path.

14. The method of claim 8, wherein the portion of the path that is different from the priority sub-path omits the priority sub-path.

15. A non-transitory computer-readable medium comprising instructions that, in response to execution, cause a system comprising a processor to perform operations, comprising:
   determining, based on a replication policy for a replication of data from a first computer to a second computer, a priority sub-path of a file system path to be replicated;
   determining to replicate first files in the priority sub-path first among the data;
   determining to replicate second files that is within the file system path and outside of the priority sub-path after replicating the first files; and
   replicating the first files and the second files from the first computer to the second computer.

16. The non-transitory computer-readable medium of claim 15, wherein the priority sub-path is a first priority sub-path, wherein the replication policy identifies a second priority sub-path, and wherein the operations further comprise:
   determining to replicate third files that corresponds to the second priority sub-path before replicating the second files; and
   replicating the third files.

17. The non-transitory computer-readable medium of claim 15, wherein the second files have a lower priority for replication than the first files.

18. The non-transitory computer-readable medium of claim 15, wherein the replication is a first replication, wherein the file system path is a first file system path, wherein the replication policy is a first replication policy, wherein the priority sub-path is a first priority sub-path, and wherein the operations further comprise:
   in response to determining that a second replication policy for a second replication omits identifying a second priority sub-path, replicating third files of a second file system path of the second replication policy in an order encountered by tree-walking the second file system path.

19. The non-transitory computer-readable medium of claim 15, wherein the operations further comprise:
   beginning the replicating of the first files before identifying the second files.

20. The non-transitory computer-readable medium of claim 15, wherein the replication policy identifies the file system path, a priority of the replication, a time to perform the replication, the first computer, or the second computer.

* * * * *